United States Patent
Cheon (10) Patent No.: US 8,918,580 B2
(45) Date of Patent: Dec. 23, 2014

(54) STORAGE DEVICE WITH BUFFER MEMORY INCLUDING NON-VOLATILE RAM AND VOLATILE RAM

(75) Inventor: Wonmoon Cheon, Hwaseongi-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 265 days.

(21) Appl. No.: 13/404,311

(22) Filed: Feb. 24, 2012

(65) Prior Publication Data

US 2012/0246392 A1    Sep. 27, 2012

(30) Foreign Application Priority Data

Mar. 23, 2011  (KR) .................. 10-2011-0026054

(51) Int. Cl.
*G06F 12/00* (2006.01)
*G06F 12/06* (2006.01)
*G06F 12/08* (2006.01)
*G06F 13/16* (2006.01)

(52) U.S. Cl.
CPC ........ *G06F 12/0638* (2013.01); *G06F 12/0871* (2013.01); *G06F 12/0866* (2013.01); *G06F 12/0868* (2013.01); *G06F 12/0873* (2013.01); *G06F 13/1673* (2013.01); *G06F 13/1668* (2013.01)
USPC .......... 711/103; 711/105; 711/113; 711/119; 711/154; 711/173

(58) Field of Classification Search
CPC ............ G06F 12/0866; G06F 12/0868; G06F 12/0871; G06F 12/0873; G06F 13/1668; G06F 13/1673
USPC ......................................... 711/103
See application file for complete search history.

(56) References Cited

U.S. PATENT DOCUMENTS

| | | |
|---|---|---|
| 7,231,497 B2 | 6/2007 | Trika et al. |
| 7,610,445 B1 | 10/2009 | Manus et al. |
| 2008/0162822 A1* | 7/2008 | Okuyama et al. ............. 711/134 |
| 2010/0037001 A1 | 2/2010 | Langlois et al. |
| 2010/0088467 A1* | 4/2010 | Lee et al. ...................... 711/104 |
| 2011/0055458 A1* | 3/2011 | Kuehne ......................... 711/103 |

* cited by examiner

*Primary Examiner* — April Y Blair
*Assistant Examiner* — Prasith Thammavong
(74) *Attorney, Agent, or Firm* — Volentine & Whitt, PLLC (57) ABSTRACT

A storage device includes a flash memory, a buffer memory and a memory controller. The buffer memory is configured to temporarily store write data to be written in the flash memory, the buffer memory including volatile RAM and non-volatile RAM. The memory controller is configured to select one of the volatile RAM and the non-volatile RAM to temporally store the write data based on a write pattern of the write data, and to transmit a host command complete signal to a host when the write data is stored in the non-volatile RAM.

16 Claims, 12 Drawing Sheets

STORAGE DEVICE WITH BUFFER MEMORY INCLUDING NON-VOLATILE RAM AND VOLATILE RAM

CROSS-REFERENCE TO RELATED APPLICATIONS

A claim of priority under 35 U.S.C. §119 is made to Korean Patent Application No. 10-2011-0026054, filed on Mar. 23, 2011, in the Korean Intellectual Property Office, the entire contents of which are hereby incorporated by reference.

BACKGROUND

Exemplary embodiments relate to a semiconductor memory device, and more particularly, relate to a data storage device including a non-volatile memory device.

Semiconductor memory devices may be classified as non-volatile memory devices and volatile memory devices. Non-volatile memory device retain data stored therein even when power is removed or off. Volatile memory devices support faster read and write operations, but data stored therein may be lost at power-off. The non-volatile memory devices may be used to store contents to be retained regardless of application of power. An example of a non-volatile memory device is a flash memory device, which may be more highly integrated than a typical electrically erasable programmable read-only memory (EEPROM), for example, so that it is suitable for auxiliary mass data storage.

Flash memory devices are increasingly used as storage media for replacing hard disk drives (HDDs), due to technological advances and reduced prices of the flash memory devices. Such a storage device may be referred to as a solid state drive (SSD) or a solid state disk. The SSD input and output data at high speeds, and mechanical delay and failure rates are typically low. Further advantages of the SSD include robust data storage against external impact, lower radiation, noise and power consumption, light weight and compactness. Also, the SSD does not use a mechanically rotating disk. Accordingly, demand for SSDs increases, particularly in wireless communications, which require storage having low power and large volume.

In general, a storage device includes volatile random access memory (RAM), such as dynamic random access memory (DRAM) or static random access memory (SRAM), as write buffer memory (or cache memory) between a host interface and flash memory. Using the volatile RAM as a write buffer minimizes the difference between an interface speed of the host and write speed of the flash memory device. Furthermore, the cache memory enables fast access to frequently accessed data. To this end, high speed volatile RAM is used as the write buffer memory (or cache memory), generally. However, data integrity may be compromised when power of the storage device is lost or otherwise removed while write data is written in the write buffer memory, but not yet written in the flash memory.

SUMMARY

According to an illustrative embodiment, a storage device includes a flash memory, a buffer memory and a memory controller. The buffer memory is configured to temporarily store write data to be written in the flash memory, the buffer memory including volatile RAM and non-volatile RAM. The memory controller is configured to select one of the volatile RAM and the non-volatile RAM to temporally store the write data based on a write pattern of the write data, and to transmit a host command complete signal to a host when the write data is stored in the non-volatile RAM.

According to another illustrative embodiment, a method is provided for storing write requested data in a storage device including a flash memory as storage medium. The method includes determining a write pattern of the write requested data and selecting one of a volatile RAM and non-volatile RAM based on the determined write pattern. When the non-volatile RAM is selected, the write requested data is stored in the non-volatile RAM, and a host command complete signal is transmitted to a host after storing the write data in the non-volatile RAM and before transmitting the write data to the flash memory. When the volatile RAM is selected, the write requested data is stored in the non-volatile RAM, and the host command complete signal is transmitted to the host after transmitting the write data to the flash memory.

According to another illustrative embodiment, a storage device includes a buffer memory and a processor. The buffer memory is configured to temporarily store write data from a host to be written in a flash memory, the buffer memory including volatile RAM and non-volatile RAM. The processor is configured to determine a write pattern of the write data, and to temporarily store the write data in the volatile RAM when the write pattern is determined to be a sequential pattern and to temporarily store the write data in the non-volatile RAM when the write pattern is determined to be a random pattern. The buffer memory transmits a host command complete signal to the host when the write data is stored in the non-volatile RAM before transmitting the write data to the flash memory.

BRIEF DESCRIPTION OF THE FIGURES

Illustrative embodiments will be more clearly understood from the following detailed description taken in conjunction with the accompanying drawings.

DETAILED DESCRIPTION

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the present teachings.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular illustrative embodiments, and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to", "directly coupled to," or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 1:
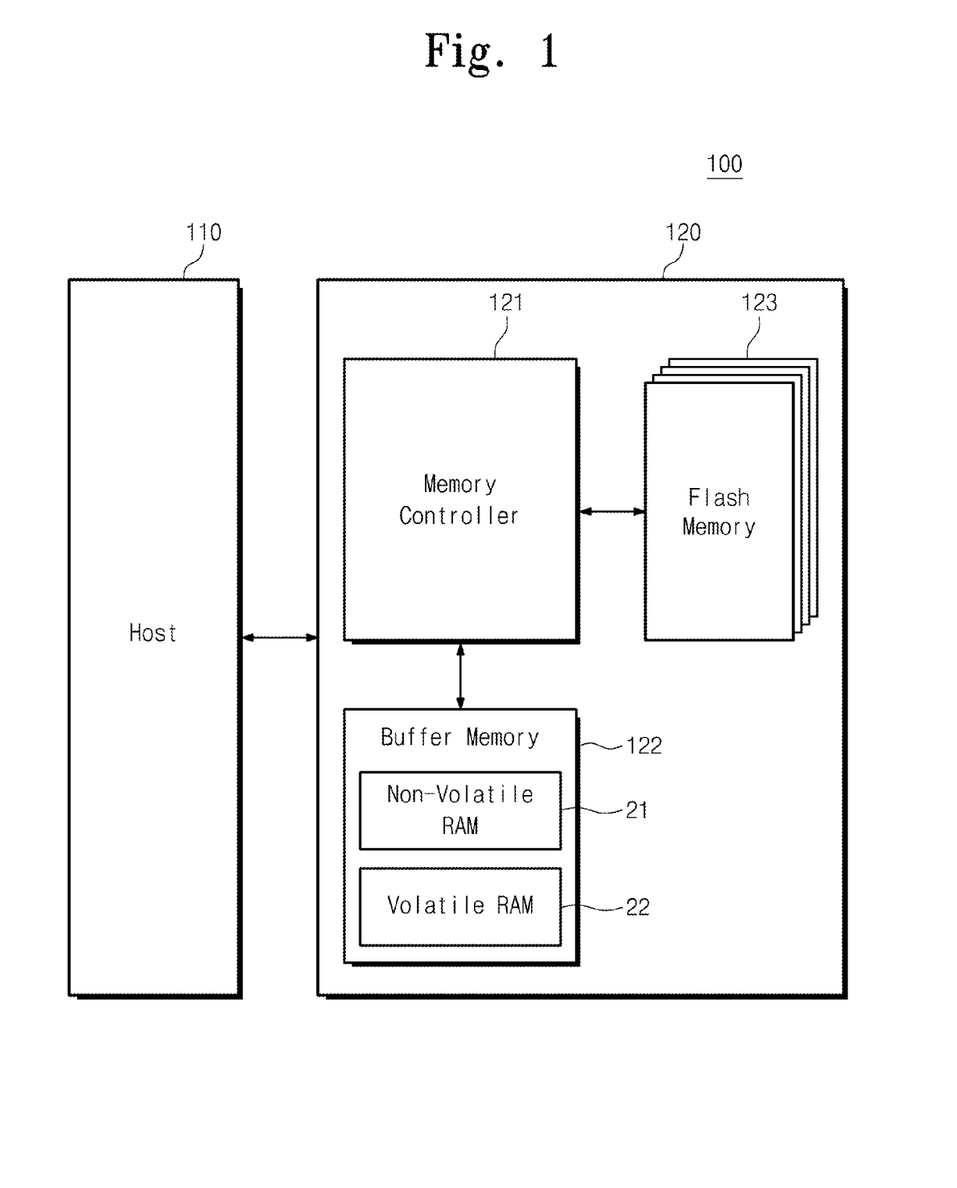
FIG. 1 is a block diagram illustrating a memory system, according to an embodiment of the inventive concept.

FIG. 1 is a block diagram illustrating a user device, according to an exemplary embodiment of the inventive concept. Referring to FIG. 1, a user device 100 includes a host 110 and a storage device 120. For example, the storage device 120 may be a solid state drive/disk (SSD). The storage device 120 includes a memory controller 121, a buffer memory 122, and a flash memory 123.

The memory controller 121 supplies physical connections between the host 110 and the storage device 120. That is, the memory controller 121 interfaces the host 110 and the storage device 120 in accordance with a bus format of the host 110. For example, the memory controller 121 may decode commands supplied by the host 110, and access the flash memory 123 according to the decoded commands.

The buffer memory 122 includes non-volatile RAM 21 and volatile RAM 22. The non-volatile RAM 21 may be one of phase-change random access memory (PRAM), magnetic random access memory (MRAM), resistance random access memory (ReRAM), or ferroelectric random access memory (FRAM), for example. The volatile RAM 22 may be SRAM or DRAM, for example. The buffer memory 122 stores write requested data (write data) provided from the host 110 or read requested data (read data) from the flash memory 123. In general, data transfer speed determined by the bus format (e.g., SATA or SAS) of the host 110 is typically much higher than that of a memory channel of the flash memory 123. In the SSD, the difference of data transfer speed between the bus format and the memory channel can be overcome by using a mass storage buffer memory and/or using multi-channel flash memory. Moreover, the buffer memory 122 may supply a cache function directly supplying cached data in the buffer memory 122 in response to a data read request from the host 110.

In accordance with an exemplary embodiment, the storage device 120 ensures data integrity in case of a sudden power-off event, without auxiliary power from an auxiliary power source (e.g., Super-cap). For example, when a data write request is received from the host 110, the memory controller 121 stores the write data in the non-volatile RAM 21 of the buffer memory 122 temporarily. The memory controller 121 then transmits the write data stored in the non-volatile RAM 21 to the flash memory 123, thus writing the write data in the flash memory 123. In this case, the memory controller 121 transmits a host command complete signal to the host 110 immediately after the write data is stored in the non-volatile RAM 21, e.g., before the write data is stored in the flash memory 123.

The amount of data stored in the non-volatile RAM 21 by random patterns is usually small. Thus, a bottleneck caused by the limited bandwidth of the non-volatile RAM 21 may be minimized.

Generally, write data supplied from the host 110 by random patterns are temporarily stored in the non-volatile RAM 21, and write data supplied from the host 110 by sequential patterns are temporarily stored in the volatile RAM 22. The random pattern write data in the non-volatile RAM 21 is then transferred to the flash memory 123. In this case, the memory controller 121 transmits the command complete signal to the host 110 immediately after the write data is stored in the non-volatile RAM 21. The sequential pattern write data in the volatile RAM 22 is also transferred to the flash memory 123, and the memory controller 121 transmits the command complete signal to the host 110 immediately after the write data is stored in the flash memory 123 (and not immediately after the write data is stored in the volatile RAM 22). Owing to the above mentioned buffering operation, generation of the command complete signal by the storage device 120 can be performed without auxiliary power.

Figure 2:
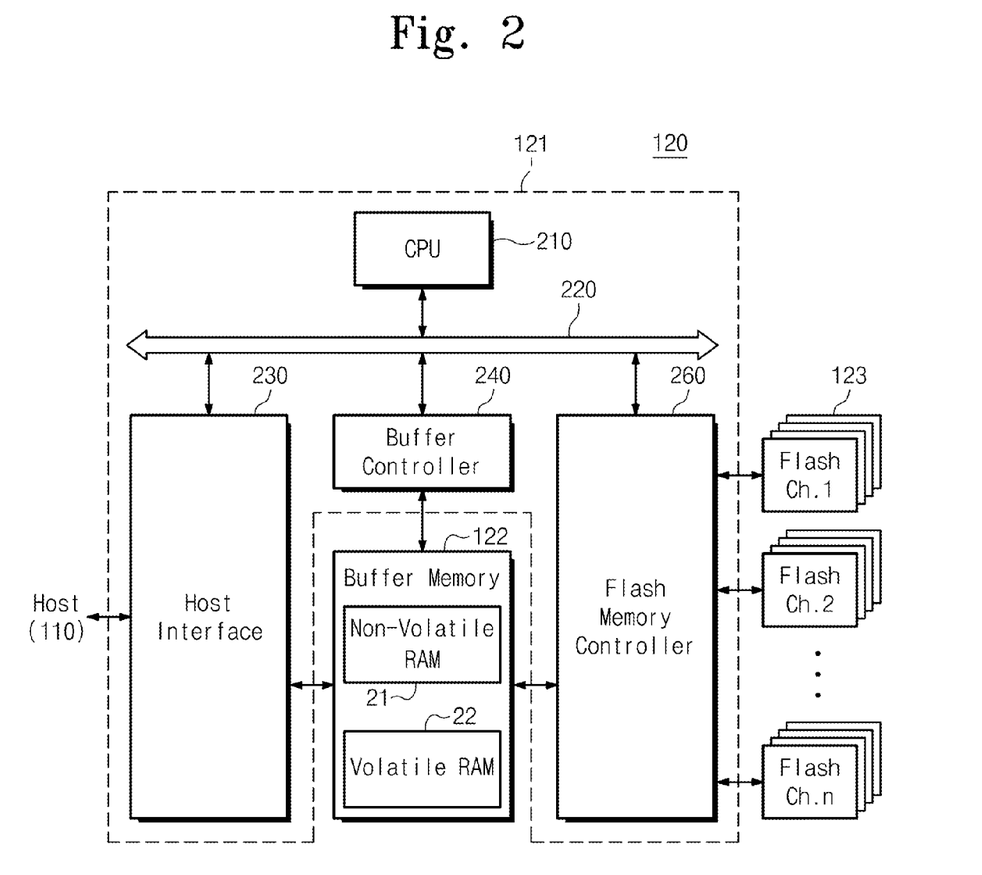
FIG. 2 is a block diagram illustrating a storage device in FIG. 1, according to an embodiment of the inventive concept.

FIG. 2 is a block diagram illustrating the storage device of FIG. 1, according to an exemplary embodiment of the inventive concept. Referring to FIG. 2, the storage device 120 includes the memory controller 121, the buffer memory 122, and the flash memory 123. The memory controller 121 includes a central processing unit (CPU) 210, a host interface 230, a buffer controller 240, and a flash memory controller 260. Each of the CPU 210, the host interface 230, the buffer controller 240, and the flash memory controller 260 is electrically connected through a data bus 220 to enable data communication with one another.

The CPU 210 controls overall operation of the storage device 120, e.g., in response to requests from the host 110. The CPU 210 transmits various control information to the host interface 230 or the flash memory controller 260 for performing read and write operations. For example, when an externally initiated command is received, the received command is stored in a register (not shown) of the host interface 230. The host interface 230 informs the CPU 210 that the command has been transferred. This operation is performed between the CPU 210 and the flash memory controller 260. The CPU 210 may control each of the elements in accordance with firmware, which is supplied for control the overall operation of the storage device 120.

Although the CPU 210 is described as single element, it may be a multi-processor device. Each of the CPUs of multi-processor device may segment and control the control operation of the memory controller 121. That is, the storage device 120 may perform multi-tasking according to the control of the CPUs of multi-processor. Further, the memory controller 121 may be a multi-processor device and may perform parallel processing. By parallel processing, the memory controller 121 may operate in high performance even when it is driven with a clock having a relatively low frequency.

The CPU 210 determines a write pattern of the write data from the host 110. The CPU 210 may determine the write pattern via various determination methods. For example, the CPU 210 may determine that the write pattern of the write data is a random pattern when the data size of continuously input data is less than or equal to a reference data size (e.g., 16 KB), and that the write pattern of the write requested data is a sequential pattern when the data size of continuously input data is greater than the reference data size. The CPU 210 may determine the write pattern of the write data via at least one of multiple algorithms, including least recently used (LRU), clean-first LRU (CFLRU), clock algorithm (CA), second chance (SC), and multi-dimensional hashing (MDH), for example.

The host interface 230 provides an interface between the host 110 and the storage device 120. For example, the host interface 230 of an SSD which adopts SATA interface performs functions, such as providing a SATA Physical Layer, Link Layer. The connection between the flash memory 123 and the host 110 may be embodied via wireless or wired communications. The host interface 230 may adopt one of various interface protocols, such as universal serial bus (USB), MultiMediaCard (MMC), Peripheral Component Interconnect Express (PCI-E), Small Computer System Interface (SCSI), serial-attached SCSI (SAS), Serial Advanced Technology Attachment (SATA), parallel ATA (PATA), Enhanced Small Disk Interface (ESDI), Integrated Drive Electronics (IDE), and the like.

The buffer memory 122 temporarily stores write data from the host 110 to be stored or read data to be sent to the host 110. The buffer memory 122 also stores Flash Translation Layer (FTL) information. The FTL information stored in the buffer memory 122 is managed by the CPU 210 for address mapping management, wear-leveling management, and data retention management, for example. For these control operations, the buffer controller 240 controls the buffer memory 122.

More particularly, the buffer memory 122 includes the non-volatile RAM 21 and the volatile RAM 22, as mentioned above. The write data from the host 110 is temporarily stored in one of the non-volatile RAM 21 and the volatile RAM 22. For example, random pattern write data is stored in the non-volatile RAM 21, temporarily, and transmitted to the flash memory 123 for programming. The CPU 210 transmits a host command complete signal to the host 110 immediately after the random pattern write data is stored in the non-volatile RAM 21. For example, the host command complete signal is transmitted to the host 110 before the random pattern write data is transmitted to the flash memory 123. In comparison, sequential pattern write data is stored in the volatile RAM 22, temporarily, and transmitted to the flash memory 123 for programming. The CPU 210 transmits a host command complete signal to the host 110 only after the sequential pattern write data is programmed in the flash memory 123.

Generally, the flash memory controller 260 performs read operations, write operations, and erase operations of the flash memory 123. The flash memory controller 260 is electrically coupled to the flash memory 123 via one or more flash memory channels (e.g., Flash Ch. 1~Flash Ch. n). The flash memory controller 160 may include an ECC engine for detecting and/or correcting errors of the write data and the read data.

The flash memory 123 is a storage medium of the storage device 120. The flash memory 123 may be a NAND type flash memory having mass storage capacity, for example. Although one flash memory 123 is depicted, it is understood that the flash memory 123 may include multiple flash memories. In this case, each of the flash memories is electrically coupled to the memory controller 121 in channel unit. Alternatively, the flash memory 123 may be a NOR flash memory, or a next-generation non-volatile memory, such as PRAM, MRAM, ReRAM, FRAM, or the like.

As mentioned above, the storage device 120 is configured to generate the host command complete signal promptly to the host 110 when buffering of the random write pattern data in the non-volatile RAM 21 is completed, without auxiliary power.

Figure 3:
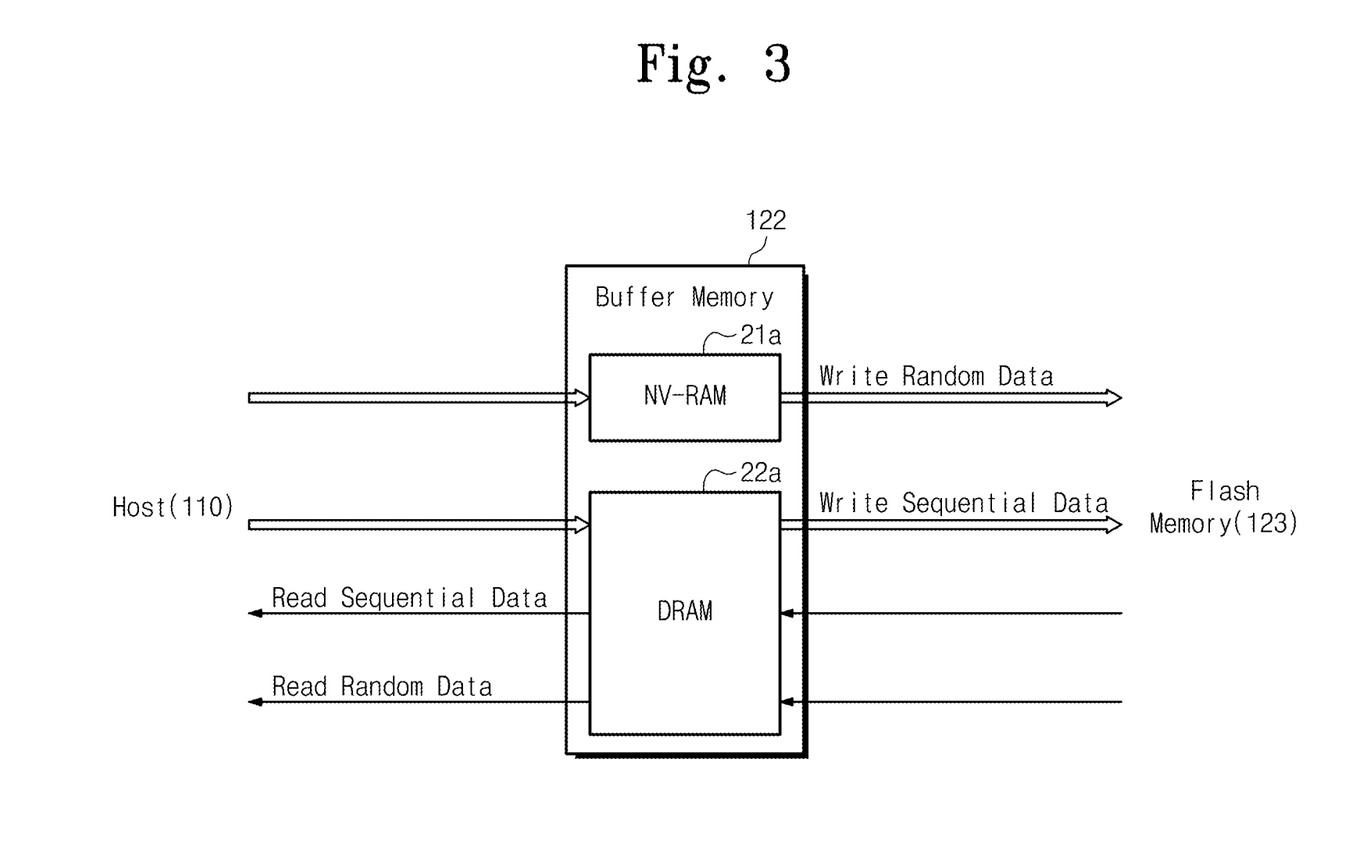
FIG. 3 is a block diagram illustrating a buffer memory in FIG. 2, according to an embodiment of the inventive concept.

FIG. 3 is a block diagram illustrating the buffer memory in FIG. 2, according to an exemplary embodiment of the inventive concept. Referring to FIG. 3, the buffer memory 122 includes non-volatile RAM 21a and DRAM 22a.

The buffer memory 122 functioning as a write buffer minimizes the difference between the host transfer speed and the write speed of the flash memory 123. Immediately after storing the write requested data in the non-volatile RAM 21a, a host command complete signal is transferred to the host 110. Furthermore, the cache memory enables fast access to frequently accessed data. Simultaneously, programming operations of the write data stored in the non-volatile RAM 21a in the flash memory 123 are performed with a channel unit of the flash memory 123, such that a fast write operation is possible.

When the write data is stored in the DRAM 22a, as opposed to the non-volatile RAM 21a, a sudden power-off event may affect the integrity of the write data. Meanwhile, using the non-volatile RAM 21a as buffer memory minimizes the defective data integrity of the write data. The write speed of the non-volatile RAM 21a, such as PRAM, MRAM, ReRAM, or FRAM, is less than the write speed of the DRAM 22a. However, the write speed of the non-volatile RAM 21a is much higher than the write speed of the flash memory 123. Thus, in an exemplary embodiment, the non-volatile RAM 21a may be assigned to buffer write data, while the DRAM 22a may be assigned to buffer read data from the flash memory 123. In another exemplary embodiment, the non-volatile RAM 21a may be assigned to buffer random pattern data requiring relatively narrow bandwidth, while the DRAM 22a may be assigned to buffer sequential pattern data requiring broad bandwidth.

The flash translation layer (FTL) may be stored in the DRAM 22a. When a mapping table of the FTL is stored in the non-volatile RAM 21a, the capacity of the non-volatile RAM 21a is significantly increased. Moreover, meta data, such as a mapping table of the FTL, should be updated frequently. Thus, the buffer memory assigned for the FTL should have fast access speed. Also, the memory controller 120 may store the write data in the DRAM 22a regardless of the write pattern of the write data when the write data corresponds to meta data.

In summary, the buffer memory 122 includes the non-volatile RAM 21a and the DRAM 22a. In an embodiment, the write data supplied by a random write pattern is programmed in the flash memory 123 as random pattern write data via the non-volatile RAM 21a, while the write data supplied by a sequential write pattern is programmed in the flash memory 123 as sequential pattern write data via the DRAM 22a.

Figure 4:
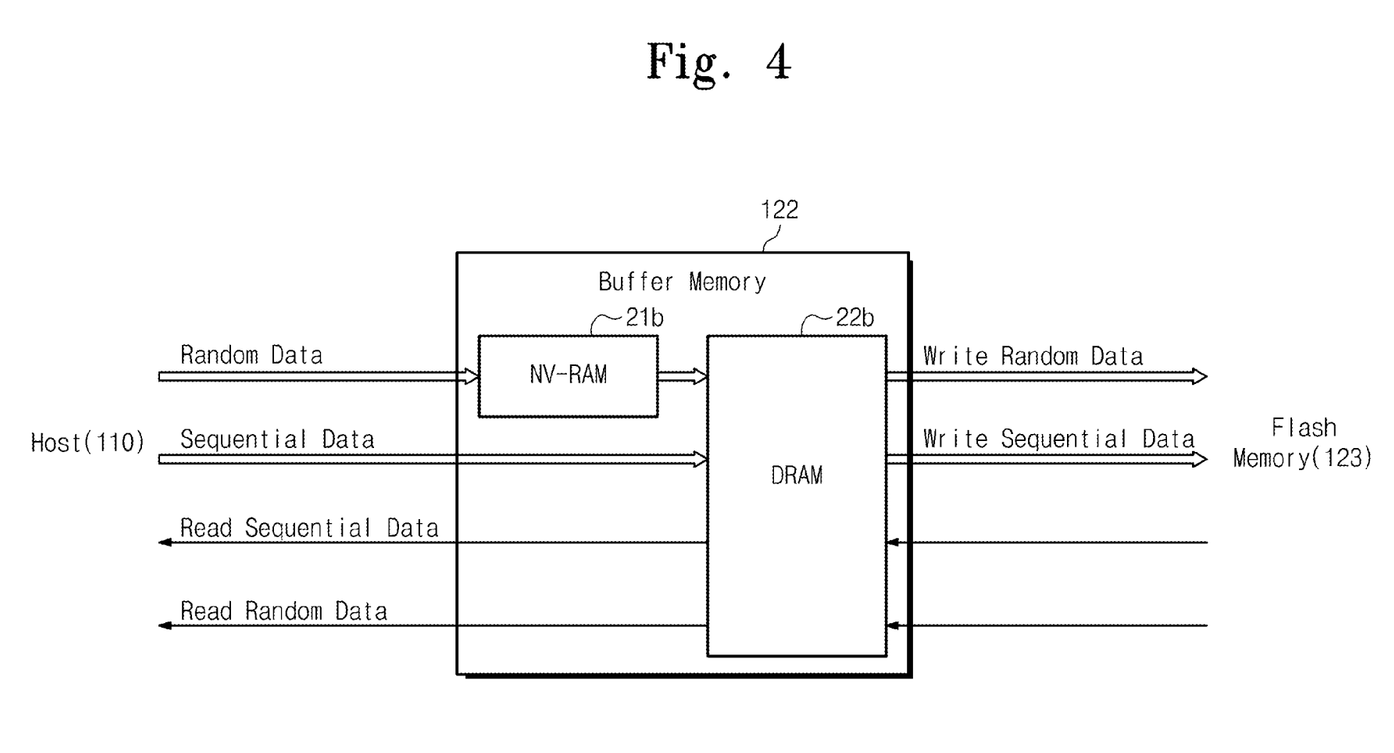
FIG. 4 is a block diagram illustrating a buffer memory in FIG. 2 according to another embodiment of the inventive concept.

FIG. 4 is a block diagram illustrating the buffer memory in FIG. 2, according to another exemplary embodiment of the inventive concept. Referring to FIG. 2 to FIG. 4, the non-volatile RAM 21b is positioned between the host interface 230 and the DRAM 22b. The random pattern write data is first buffered in the non-volatile RAM 21b and then transferred to the DRAM 22b. The random pattern write data in the DRAM 22b, received via the non-volatile RAM 21b, is written to the flash memory 123 as random pattern write data. However, the sequential pattern write data is stored in the DRAM 22b and written to the flash memory 123 as sequential pattern write data, without being stored in the non-volatile RAM 21b. The DRAM 22b is assigned as buffer memory for overall random pattern read data and sequential pattern read data.

In this embodiment, the random pattern write data that is not programmed in the flash memory 123 can be maintained in the non-volatile RAM 21b during a sudden power-off event. Thus, the buffer memory 122 in the depicted exemplary embodiment is able to maintain data integrity during the write operation, even without auxiliary power.

Figure 5:
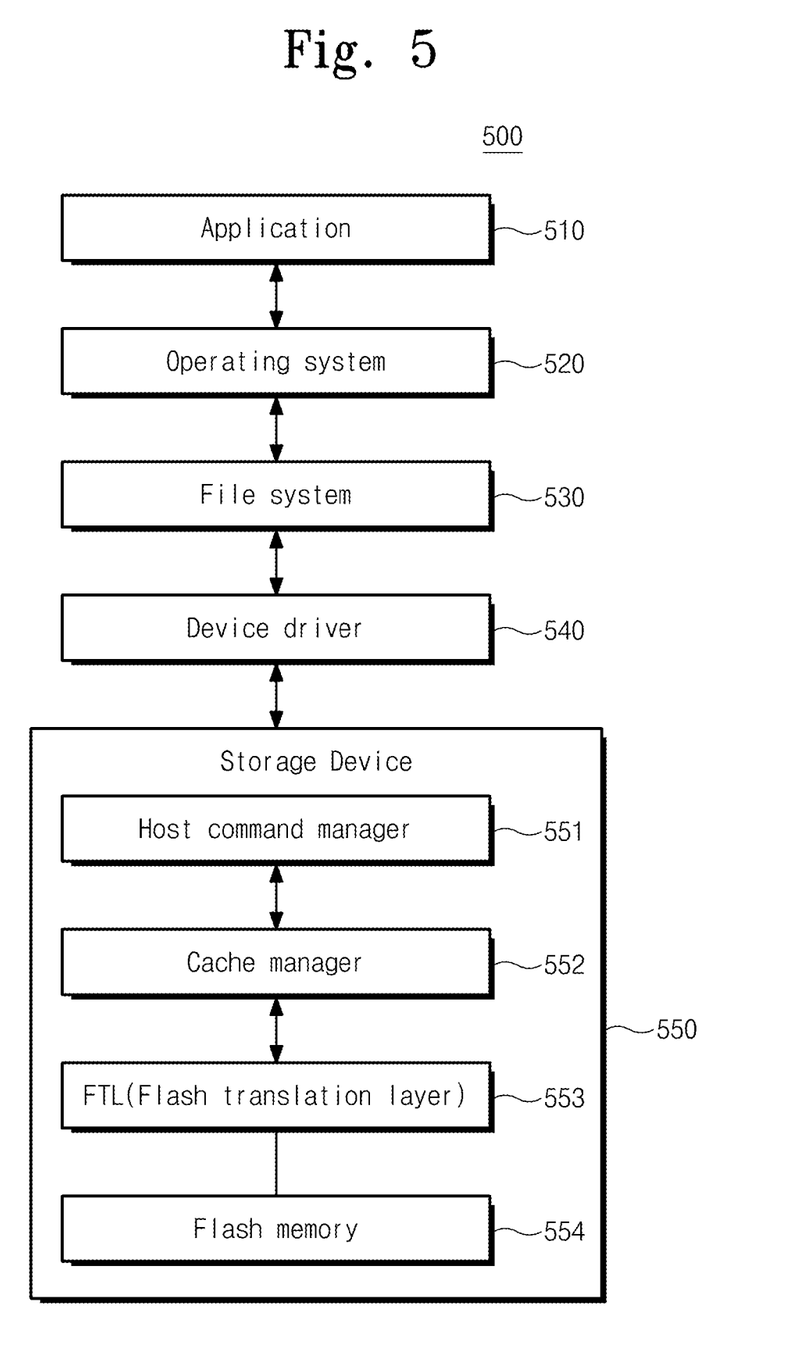
FIG. 5 is a diagram for illustrating a software layer structure of the memory system in FIG. 1, according to an embodiment of the inventive concept.

FIG. 5 is a block diagram illustrating a software hierarchical structure of a user device, according to an exemplary embodiment. Referring to FIG. 2 to FIG. 5, software hierarchical structure 500 of the user device 100 is configured with an application 510, an operating system 520, a file system 530, a device driver 540, and a storage device soft hierarchical structure 550. The storage device soft hierarchical structure 550 is configured with a host command manager 551, a cache manager 552, a FTL 553, and flash memory 554.

The application 510 may be implemented as various application programs operable by the user device 100. For example, the application 510 may include a document editor, a web browser, voice or video players, and the like.

The operating system 520 controls overall operations of the user device 100. For example, the operating system 520 may include Microsoft Windows, Mac OS, Linux OS, DOS, or the like.

The file system 530 manages memory region and data of the flash memory 554. For example, the file system 530 may be one of FAT, FAT32, NTFS, HFS, JSF2, XFS, ODS-5, UDF, ZFS, UFS (Unix File System), ext2, ext3, ext4, ReiserFS, Reiser4, ISO 9660, Gnome VFS, BFS, WinFS, or the like.

The device driver 540 is configured to communicate between the file system 530 and the storage device soft hierarchical structure 550. To use the storage device, such as SSD, the device driver 540 corresponding to the storage device should be installed in the host.

The host command manager 551 is a software module for processing the command supplied from the host. The cache manager 552 is a software module for managing cache operations of the non-volatile RAM 21 and the volatile RAM 22 of the buffer memory 122. The buffer memory should be a random access memory. In particular, the cache manager 552 assigns one of non-volatile RAM 21 and the volatile RAM 22 referring to the write request from the host. For example, for random write patterns, the cash manager 552 assigns the non-volatile RAM 21 as the cache memory, and for sequential write patterns, the cache manager 552 assigns one of the non-volatile RAM 21 and the volatile RAM 22 as the cache memory.

The FTL 553 performs address mapping between logical addresses from the host and physical addresses of the flash memory 554. The FTL 553 is configured to translate a logical address to a physical address of the flash memory 554 based on the mapping information. Furthermore, the flash translation layer 553 may perform background operations, such as wear-leveling, garbage collection, and merge operation, for example.

The flash memory 554 stores data. For example, the flash memory 554 may be a NAND flash memory. The flash memory 554 includes multiple memory blocks, each of which includes multiple pages. Each of the pages includes multiple memory cells for storing the page of data. The flash memory 554 performs write operations by page unit and performs erase operations by block units. The flash memory 554 may have erase-before write characteristics, for example.

Figure 6:
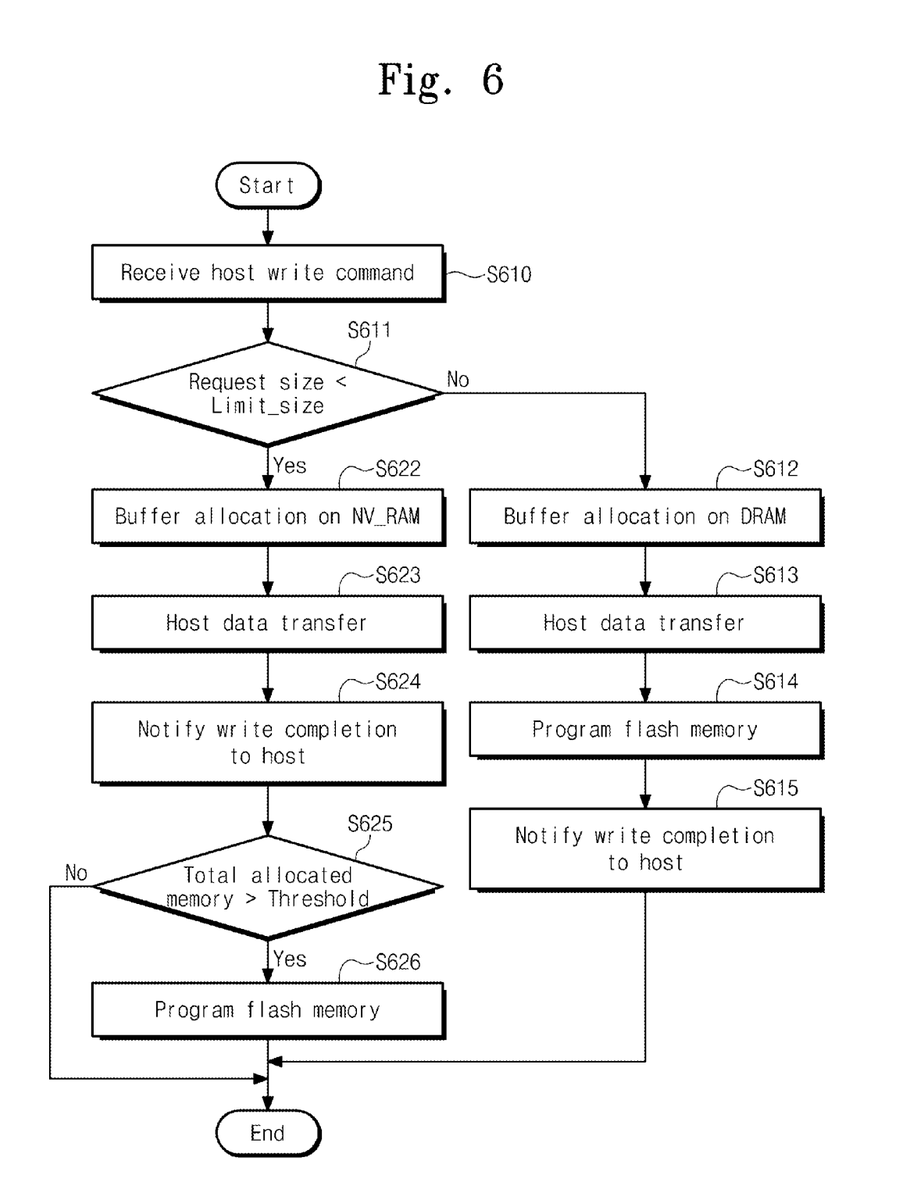
FIG. 6 is a flowchart for describing a buffer operation of the storage device, according to an embodiment of the inventive concept.

FIG. 6 is a flowchart illustrating a buffer operation of the storage device, according to an exemplary embodiment of the inventive concept. Referring to FIG. 2, FIG. 3, FIG. 5, and FIG. 6, a host write command including a write request and write data is supplied from the host 110 in operation S610.

In operation S611, the memory controller 121 compares data size of the write data and a reference size Limit_size for determining whether the write data is sequential pattern write data or random pattern write data. The reference size Limit_size may be varied considering to properties of the storage device and/or data transmission. For example, the write data may be determined to be random pattern write data when the number of continuous sectors in the write data is less than or equal to a reference value, unless the write data is determined to be sequential pattern write data.

In operation S612, when the size of the write requested data continuously received is greater than or equal to (that is, not less than) the reference value Limit_size, the memory controller 121 assigns the write requested data to the volatile RAM 22 (e.g., DRAM). In operation S613, the memory controller 121 stores the write data transferred from the host 110 to a memory region of the volatile RAM 22. In operation S614, the memory controller 121 programs the buffered data in the volatile RAM 22 to the flash memory 123 via multiple memory channels, in parallel. In operation S615, the memory controller 121 generates and sends the host command complete signal to the host 110 when the write operation of the flash memory 123 is completed.

On the other hand, when it is determined in operation S611 that the size of the write data continuously received is less than the reference value Limit_size, the memory controller 121 assigns the write data to the non-volatile RAM 21 in operation S622. In operation S623, the memory controller 121 stores temporarily the write requested data transferred from the host 110 to the non-volatile RAM 21. In operation S624, the memory controller 121 immediately generates and sends the host command complete signal to the host when the write requested data have been written into the non-volatile RAM 21.

In operation S625, the memory controller 121 determines whether the total allocated memory available in the non-volatile RAM 21 is greater than a threshold level (reference capacity). When the available memory drops be below the threshold level, the non-volatile RAM 21 performs a flush operation from the non-volatile RAM 21 to the flash memory 123. At this moment, although the available size of the non-volatile RAM 21 is still sufficient, the write operation is ended without the flush operation. Otherwise the flash memory 123 is programmed in operation S626.

Figure 7:
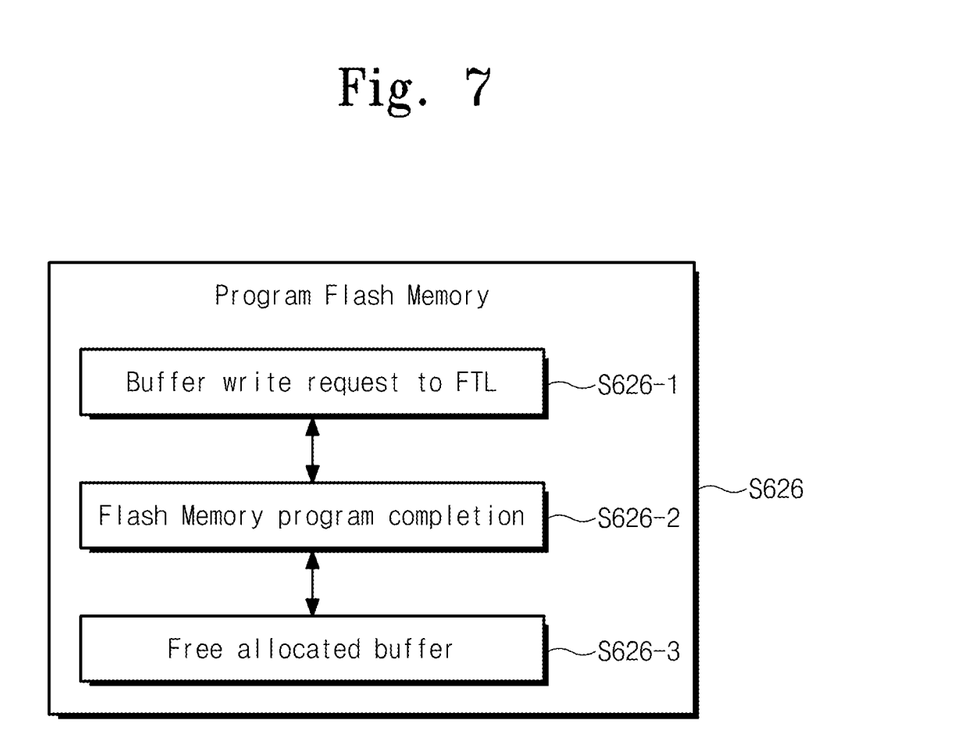
FIG. 7 is a flowchart for describing the programming operation of the flash memory in FIG. 6, according to an embodiment of the inventive concept.

FIG. 7 is a flowchart illustrating operation S626 of the FIG. 6, according to an exemplary embodiment of the inventive concept. Referring to FIG. 6 and FIG. 7, the operation S626 is performed to program the write data in the buffer memory 122 to the flash memory 123.

In the operation S626-1, a buffer write request to the FTL is performed. In the operation S626-2, the FTL controls the program operation for writing the temporarily stored data in the buffer memory 122 to the flash memory 123. At this moment, a parallel programming operation via multiple memory channels enables a high performance write operation. In the operation S626-3, when the programming operation is completed, the buffer memory region assigned to the write requested data is freed and assigned to the next write requested data.

Figure 8:
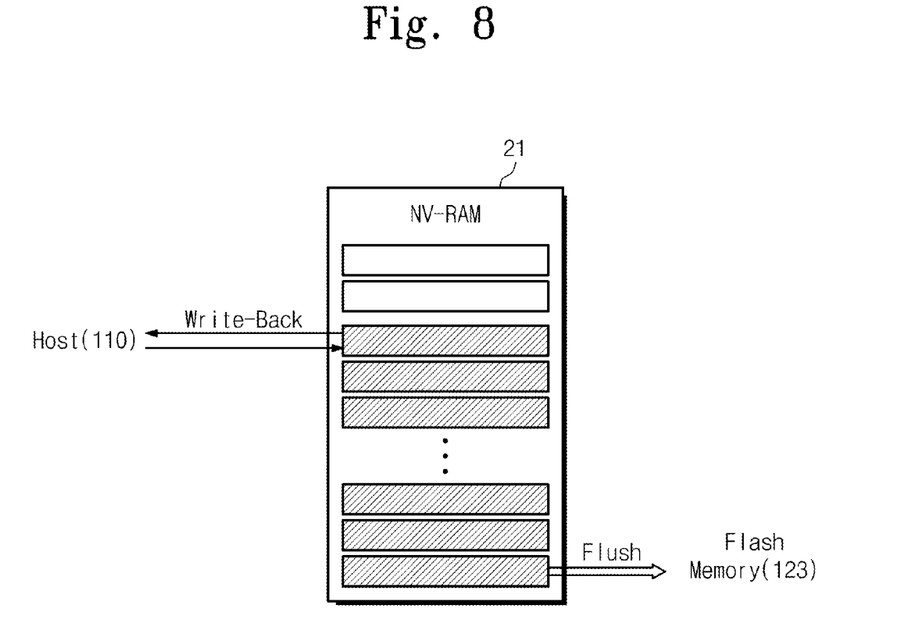
FIG. 8 is a block diagram for describing a cache operation of the non-volatile RAM, according to an embodiment of the inventive concept.

FIG. 8 is a diagram showing a cache operation of the non-volatile RAM, according to an exemplary embodiment of the inventive concept. Referring to FIG. 6 to FIG. 8, the non-volatile RAM 21 is used as a write buffer to store the write data temporarily from the host 110. Also, the non-volatile RAM 21 may be configured to operate as cache memory to support fast read operations on frequently accessed data.

When the write request or the read request is applied from the host 110, the non-volatile RAM 21 temporarily stores sectors of the write data or the read data. For example, write data from the host 110 is determined to be random pattern write data when the number of continuous sectors in the write data is less than a reference value. The memory controller 120 stores the write data in the non-volatile RAM 21 and transmits a host command complete signal to the host 110 immediately after the write requested data is stored into the non-volatile RAM 21. This cache operation may be referred to as "write-back." For the cache operation, read data read from the flash memory 123 is maintained in the non-volatile RAM 21. Thus, the host 110 accesses the non-volatile RAM 21 for read out of the read data.

A last recently used (LRU) algorithm may be applied for the cache operation of the non-volatile RAM 21. Under the LRU algorithm condition, when the size of stored data in the non-volatile RAM 21 exceeds a reference (threshold) value, a sector of earlier stored data is flushed to the flash memory 123. Thus, the probability of hit on the non-volatile RAM 21 can be increased.

Figure 9A:
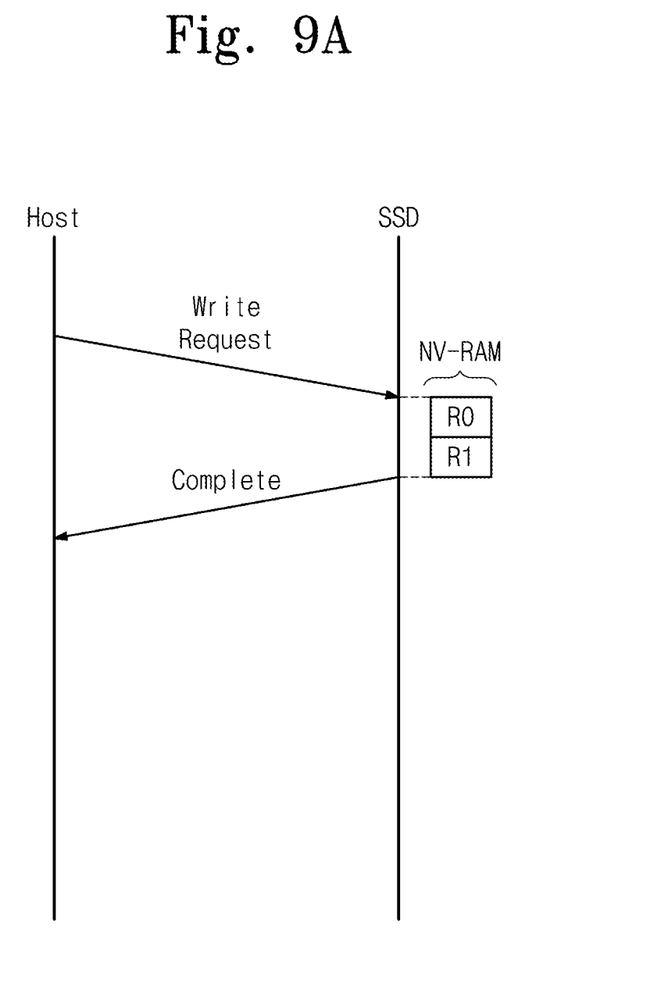
FIG. 9A, FIG. 9B, and FIG. 9C are diagrams for describing a cache operation of buffer memory, according to an embodiment of the inventive concept.

FIG. 9A is a diagram showing a cache operation of the non-volatile RAM, according to an exemplary embodiment of the inventive concept. Referring to FIG. 6 and FIG. 9a, the storage device 120 (e.g., an SSD), receives a write request and write data R0~R1 from the host 110. When the write data R0~R1 is random pattern write data, the write data R0~R1 is stored in the non-volatile RAM 21, temporarily. The host command complete signal "Complete" is transferred to the host 110 once the write data is stored into the non-volatile RAM 21. This operation is generally referred to as a "write-back operation." At this moment, the random pattern write data has been stored in the non-volatile RAM 21 of the buffer memory 122, not in the flash memory 123. Thus, even though the random pattern write data is stored in the buffer memory 122 and not the flash memory 123, data integrity is insured owing to the non-volatile RAM 21 in case of a sudden power-off event.

Figure 9B:
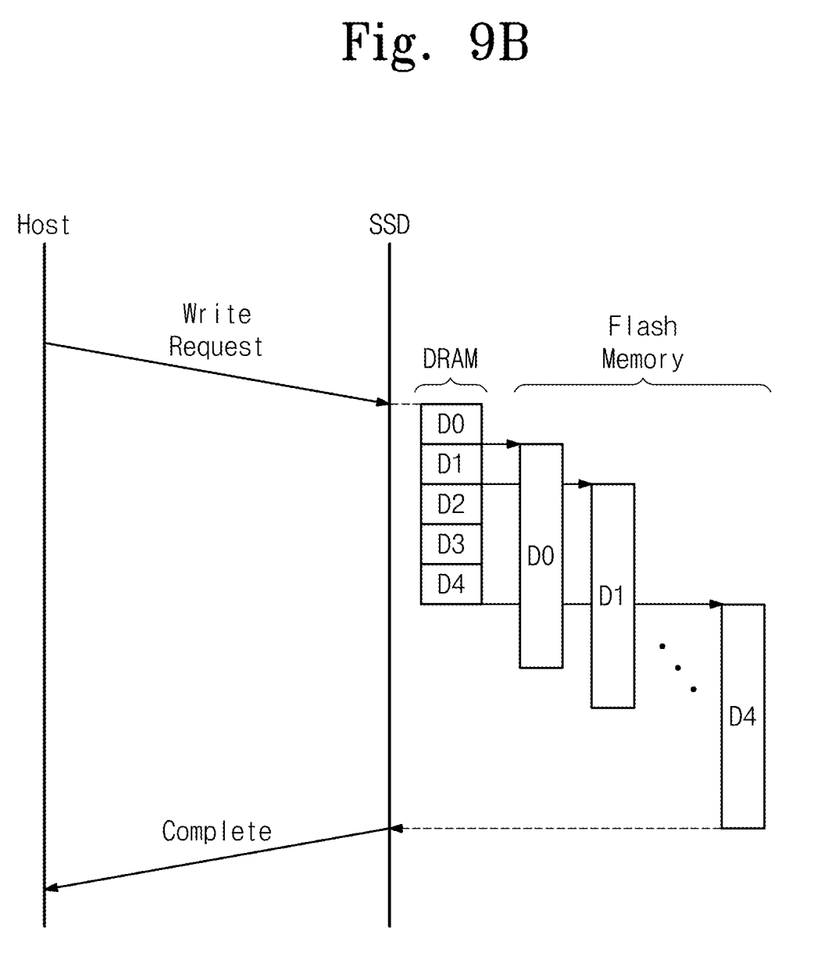

FIG. 9B is a diagram showing a cache operation of the volatile RAM, according to an exemplary embodiment of the inventive concept. Referring to FIG. 6 and FIG. 9B, the storage device 120 (e.g., an SSD), receives a write request and write data D0~D4 from the host 110. When the write data D0~D4 are sequential pattern write data, the write data D0~D4 is stored in the volatile RAM 22 (e.g., DRAM), temporarily. The write data D0~D4 is then programmed in parallel to the flash memory 123 via multiple memory channels, as depicted.

When the programming operation to the flash memory 123 is complete, the memory controller 121 transfers the host command complete signal "Complete" to the host 110. In short, when sequential pattern write data are received, the received sequential pattern write data are buffered in the volatile RAM 22, and the host command complete signal "Complete" is transferred to the host 110 after the sequential pattern write data is programmed into the flash memory 123. This operation is generally referred to as a "write-through operation."

Figure 9C:
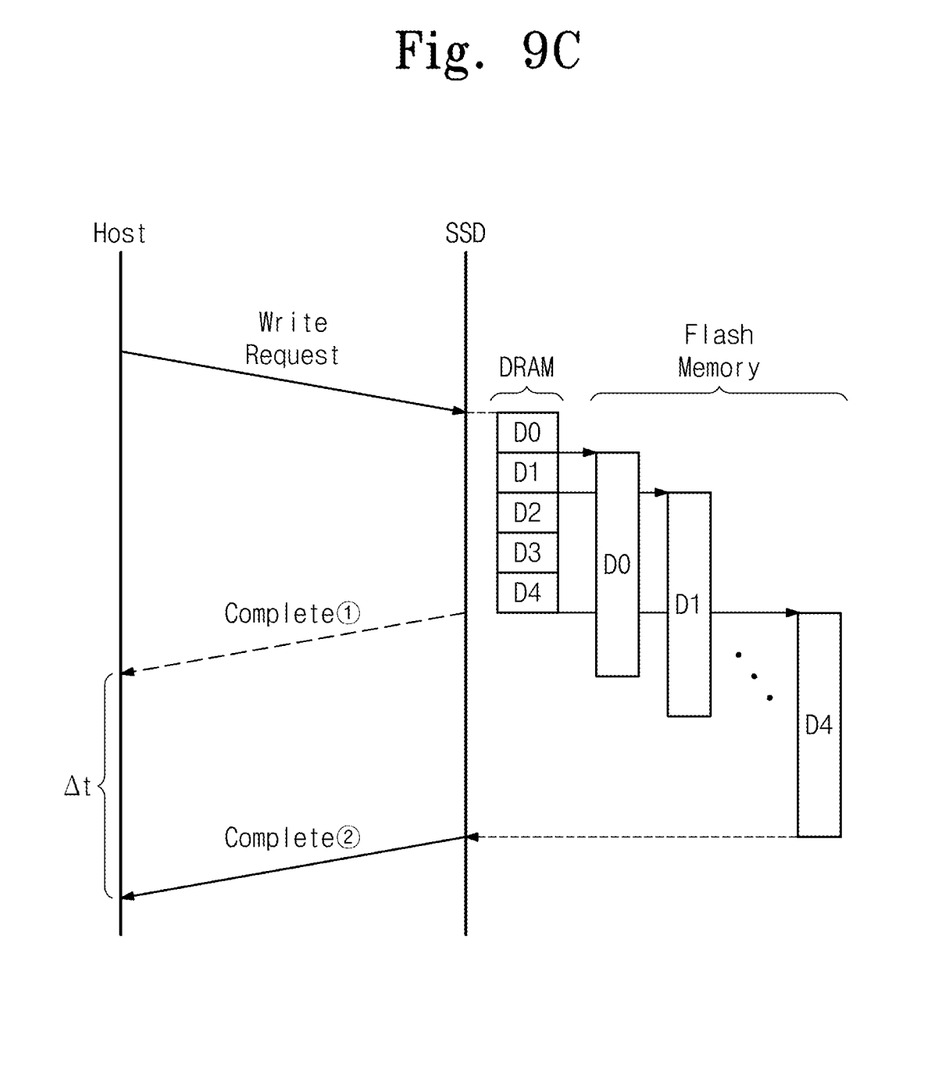

FIG. 9C is a diagram showing a required time of a cache operation of the volatile RAM, according to an exemplary embodiment of the inventive concept. Referring to FIG. 9B and FIG. 9C, the storage device 120 (e.g., an SSD) receives a write request and write data D0~D4 from the host 110. When the write data D0~D4 is sequential pattern write data, a time difference $\Delta t$ between the write-back operation mode and the write-through operation mode can be considered.

When the sequential pattern write data is managed in the write-back operation mode, the response speed of the host command complete signal "Complete" is higher than that of the write-through operation mode. However, the sequential pattern write data stored in the volatile RAM 22 can be lost upon occurrence of a sudden power-off event. Thus, the sequential pattern write data is managed in the write-through operation mode. Compensation for the differing response speeds can be realized by programming the sequential pattern write data to the flash memory 123 in parallel via multiple memory channels.

Figure 10:
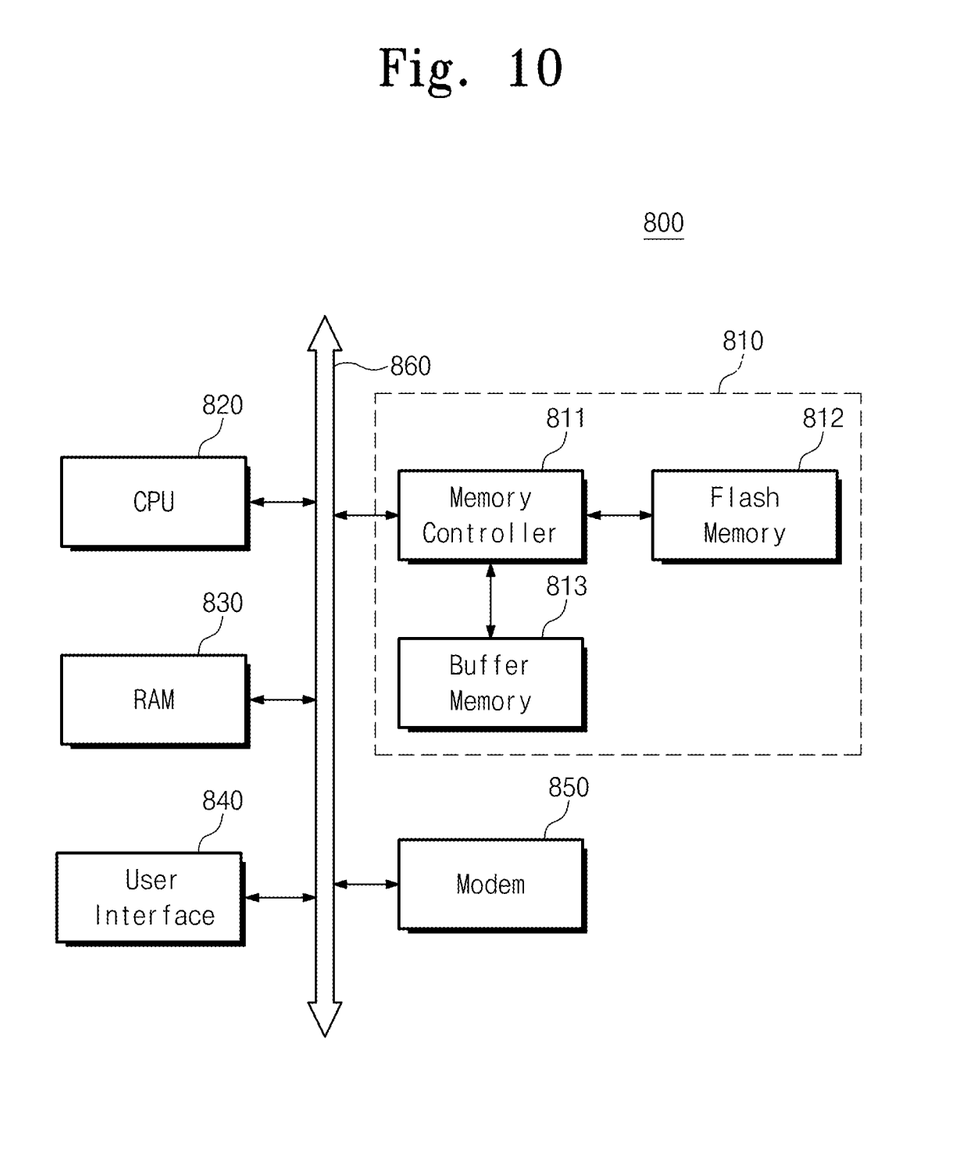
FIG. 10 is a block diagram of a computing system, according to an exemplary embodiment of the inventive concept.

FIG. 10 is a block diagram illustrating a computing system including a storage device, according to an exemplary embodiment of the inventive concept. A computing system 800 includes a CPU (or microprocessor) 820, RAM 830, a user interface 840, a modem 850, such as a baseband chipset, and a storage device 810, which are electrically connected through a system bus 860. When the computing system 800 is a mobile device, it may further include a battery (not shown)

which powers the computing system 800. Although not shown in FIG. 10, the computing system 800 may further include an application chipset, a camera image processor (CIS), mobile DRAM, and the like. The storage device 810 may be a solid state drive/disk (SSD) which uses non-volatile memory to store data. Alternatively, the storage device 810 may be formed of a fusion flash memory (e.g., a One-NAND flash memory).

As discussed above, the storage device 810 may include a memory controller 811, a flash memory, and a buffer memory 813. The memory controller 811 controls the buffer memory 813 to minimize a speed difference between an interface speed of the host and write speed of the flash memory 812. The memory controller may determine the write pattern of the write data by measuring the size of continuous sectors of the write data. The buffer memory 813 may include volatile RAM, such as DRAM or SRAM. The buffer memory 813 may further include non-volatile RAM, such as PRAM, MRAM, RRAM, FRAM, etc. When the write data to be programmed in the flash memory 812 is sequential pattern write data, the write data is buffered in the volatile RAM, and when write data to be programmed in the flash memory 812 is random pattern write data, the write data is buffered in the non-volatile RAM, as discussed above.

A non-volatile memory device or a memory controller may be packaged, for example, in one of various types of packages, such as PoP (Package on Package), Ball grid arrays (BGAs), Chip scale packages (CSPs), Plastic Leaded Chip Carrier (PLCC), Plastic Dual In-Line Package (PDI2P), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A storage device comprising:
   a flash memory;
   a buffer memory configured to temporarily store write data to be written in the flash memory, the buffer memory comprising volatile RAM and non-volatile RAM; and
   a memory controller configured to select one of the volatile RAM and the non-volatile RAM to temporally store the write data based on a write pattern of the write data, and to transmit a host command complete signal to a host when the write data is stored in the non-volatile RAM,
   wherein the memory controller is configured to store a random pattern write data in the non-volatile RAM temporarily and to store a sequential pattern write data in the volatile RAM temporarily.

2. The storage device of claim 1, wherein the memory controller is further configured to store the write data in the volatile RAM regardless of the write pattern of the write data when the write data corresponds to meta data.

3. The storage device of claim 1, wherein the memory controller is further configured to determine that the write pattern of the write data is the random pattern when the number of continuous sectors of the write data is less than a reference value, and to determine that the write pattern of the write data is the sequential pattern when the number of continuous sectors of the write data is greater than or equal to the reference value.

4. The storage device of claim 1, wherein the memory controller is further configured to transmit the random pattern write data from the non-volatile RAM to the volatile RAM before storing the random pattern write data in the flash memory.

5. The storage device of claim 1, wherein the memory controller is further configured to program the sequential pattern write data in the flash memory after storing the sequential pattern write data in the volatile RAM temporarily.

6. The storage device of claim 5, wherein the memory controller is further configured to transmit the host command complete signal to the host after storing the sequential pattern write data in the flash memory.

7. The storage device of claim 1, wherein the memory controller is further configured to flush data stored in the non-volatile RAM into the flash memory when data stored in the non-volatile RAM exceeds a reference capacity.

8. The storage device of claim 1, wherein the memory controller is further configured to generate the host command complete signal after storing the random pattern write data in the non-volatile RAM is completed, and before the random pattern write data is stored in the flash memory.

9. The storage device of claim 1, wherein the storage device does not include an auxiliary power source.

10. A method of storing write requested data in a storage device including a flash memory as storage medium, the method comprising:
    determining a write pattern of the write requested data;
    selecting one of a volatile RAM and non-volatile RAM based on the determined write pattern;
    when the non-volatile RAM is selected, storing the write requested data in the non-volatile RAM, and transmitting a host command complete signal to a host after storing the write data in the non-volatile RAM and before transmitting the write data to the flash memory; and
    when the volatile RAM is selected, storing the write requested data in the volatile RAM, and transmitting the host command complete signal to the host after transmitting the write data to the flash memory,
    wherein the non-volatile RAM is selected when the write pattern of the write requested data determined to be a random pattern, and the volatile RAM is selected when the write pattern of the write requested data is determined to be a sequential pattern.

11. The method of claim 10, wherein determining the write pattern of the write requested data comprises:
    determining the write requested data to be the random pattern write data when the number of continuous sectors in the write requested data is less than a reference value, and
    determining the write requested data to be the sequential pattern write data when the number of continuous sectors in the write requested data is greater than the reference value.

12. The method of claim 10, further comprising:
    transmitting the write requested data stored in the non-volatile RAM to the volatile RAM before transmitting the write requested data to the flash memory.

13. The method of claim 12, further comprising:
    flushing data in the non-volatile RAM into the flash memory when excessive data is stored in the non-volatile RAM compared with a reference capacity.

14. A storage device comprising:
a buffer memory configured to temporarily store write data from a host to be written in a flash memory, the buffer memory comprising volatile RAM and non-volatile RAM; and
a processor configured to determine a write pattern of the write data, and to temporarily store the write data in the volatile RAM when the write pattern is determined to be a sequential pattern and to temporarily store the write data in the non-volatile RAM when the write pattern is determined to be a random pattern,
wherein the buffer memory transmits a host command complete signal to the host when the write data is stored in the non-volatile RAM before transmitting the write data to the flash memory.

15. The storage device of claim 14, wherein the volatile RAM comprises dynamic random access memory (DRAM).

16. The storage device of claim 14, further comprising:
a host interface configured to interface with the host; and
a flash memory controller configured to program the write data to the flash memory.

* * * * *